(12) United States Patent
Ali et al.

(10) Patent No.: US 10,959,235 B2
(45) Date of Patent: Mar. 23, 2021

(54) PERFORMANCE INDICATOR FOR INTERWORKING RADIO ACCESS TECHNOLOGIES

(71) Applicant: Nokia Technologies Oy, Espoo (FI)

(72) Inventors: Amaanat Ali, Espoo (FI); Tero Henttonen, Espoo (FI); Malgorzata Tomala, Wroclaw (PL)

(73) Assignee: Nokia Technologies Oy, Finland (FI)

( * ) Notice: Subject to any disclaimer, the term of this patent is extended or adjusted under 35 U.S.C. 154(b) by 0 days.

(21) Appl. No.: 16/476,202

(22) PCT Filed: Dec. 27, 2017

(86) PCT No.: PCT/FI2017/050937
§ 371 (c)(1),
(2) Date: Jul. 5, 2019

(87) PCT Pub. No.: WO2018/127622
PCT Pub. Date: Jul. 12, 2018

(65) Prior Publication Data
US 2019/0357199 A1 Nov. 21, 2019

Related U.S. Application Data

(60) Provisional application No. 62/442,619, filed on Jan. 5, 2017.

(51) Int. Cl.
*H04W 76/16* (2018.01)
*H04W 72/04* (2009.01)
(Continued)

(52) U.S. Cl.
CPC .......... *H04W 72/048* (2013.01); *H04W 4/50* (2018.02); *H04W 8/24* (2013.01); *H04W 48/16* (2013.01);
(Continued)

(58) Field of Classification Search
CPC . H04L 5/001; H04L 5/0092; H04L 29/06537; H04L 29/08; H04L 69/24;
(Continued)

(56) References Cited

U.S. PATENT DOCUMENTS 9,226,136 B2 12/2015 Kim et al.
9,277,398 B2 3/2016 Yamada et al.
(Continued)

FOREIGN PATENT DOCUMENTS

WO 2013/126859 A2 8/2013
WO 2014/181176 A1 11/2014
(Continued)

OTHER PUBLICATIONS

CATT, Open issues of LTE-NR Tight Interworking, 3GPP TSG RAN WG2 Meeting #95, R2-164799, 3 pages, Aug. 2016.*
(Continued)

*Primary Examiner* — Frank Duong
(74) *Attorney, Agent, or Firm* — Harrington & Smith

(57) ABSTRACT

A radio access node such as a master eNB determines that a UE can support operation on a given radio band combination comprising a first radio band operating with a first RAT such as E-UTRA and a second radio band operating with a second RAT such as 5G. The node uses a performance capability of the UE to obtain at least a second configuration for the second radio band operating with the second RAT, then configures the UE with the interworking configuration that comprising a first configuration to operate on the first band with the first RAT and a second configuration to operate on the second band with the second RAT. The node may determines that the UE can support such operation from a UE message identifying the band combination and carrying an indicator of the performance capability of the UE on at least the second RAT.

20 Claims, 8 Drawing Sheets

(51) Int. Cl.
*H04W 4/50* (2018.01)
*H04W 8/24* (2009.01)
*H04W 48/16* (2009.01)
*H04W 48/18* (2009.01)
*H04W 88/08* (2009.01)
*H04W 92/20* (2009.01)

(52) U.S. Cl.
CPC ........... *H04W 48/18* (2013.01); *H04W 88/08* (2013.01); *H04W 92/20* (2013.01)

(58) Field of Classification Search
CPC ....... H04W 4/50; H04W 8/24; H04W 72/048; H04W 48/16; H04W 48/18; H04W 88/08; H04W 92/20
See application file for complete search history.

(56) References Cited

U.S. PATENT DOCUMENTS

| | | | | |
|---|---|---|---|---|
| 9,967,784 | B2* | 5/2018 | Kim | H04W 36/0055 |
| 10,485,000 | B2* | 11/2019 | Shaheen | H04W 36/0022 |
| 10,536,955 | B2* | 1/2020 | Gholmieh | H04W 72/1215 |
| 10,660,025 | B2* | 5/2020 | Wu | H04W 88/10 |
| 10,694,580 | B2* | 6/2020 | Hwang | H04W 40/18 |
| 2011/0122801 | A1 | 5/2011 | Franklin et al. | |
| 2018/0049213 | A1 | 2/2018 | Gholmieh et al. | |
| 2019/0132896 | A1* | 5/2019 | Kusashima | H04L 5/14 |
| 2019/0141770 | A1* | 5/2019 | Takahashi | H04W 8/24 |
| 2019/0281645 | A1* | 9/2019 | Van Der Velde | H04W 28/0215 |
| 2020/0267791 | A1* | 8/2020 | Yilmaz | H04W 76/16 |

FOREIGN PATENT DOCUMENTS

| | | |
|---|---|---|
| WO | 2016/169058 A1 | 10/2016 |
| WO | 2018/031846 A1 | 2/2018 |
| WO | 2018/037333 A1 | 3/2018 |
| WO | 2018/083374 A1 | 5/2018 |

OTHER PUBLICATIONS

CATT, CP procedures for LTE and NR interworking, 3GPP TSG RAN WG2 Meeting #95, R2-164712, 4 pages, Aug. 2016.*
CATT, UE capability coordination for LTE and NR interworking, 3GPP TSG RAN WG2 Meeting #95bis, R2-166098 4 pages, Oct. 2016.*
Nokia, Alcatel-Lucent Shanghai Bell, On UE capability and network node coordination aspects in LTE-NR tight interworking, 3GPP TSG-RAN WG2 Meeting #95bis, R2-166243, 9 pages, Oct. 2016.*
ZTE, ZTE Microelectronics, Consideration on the capability coordination in LTE/NR tight interworking, 3GPP TSG-RAN WG2 Meeting #95bis, R2-166349, 5 pages, Oct. 2016.*
Nokia, Alcatel-Lucent Shanghai Bell, UE capability aspects for LTE NR tight interworking, 3GPP TSG-RAN WG2 NR Adhoc, R2-1700054, 3 pages, Jan. 2017.*
"Considerations for Additional WLAN Metrics", 3GPP TSG-RAN WG2 meeting #95, R2-165423, Agenda: 8.5.4, Intel Corporation, Aug. 22-26, 2016, pp. 1-3.
"Throughput Estimation Measurement for WLAN", 3GPP TSG-RAN WG2 meeting #96, R2-167528, Agenda: 8.5.4, Nokia, Nov. 14-18, 2016, 7 pages.
International Search Report and Written Opinion received for corresponding Patent Cooperation Treaty Application No. PCT/FI2017/050937, dated Mar. 26, 2018, 28 pages.
"3rd Generation Partnership Project; Technical Specification Group Radio Access Network; Study on New Radio Access Technology; Radio Interface Protocol Aspects (Release 14)", 3GPP TR 38.804, V0.4.0, Nov., 2016, pp. 1-30.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.1.0, Dec. 2016, pp. 1-654.
Extended European Search Report received for corresponding European Patent Application No. 17889710.4, dated Jul. 22, 2020, 8 pages.

* cited by examiner

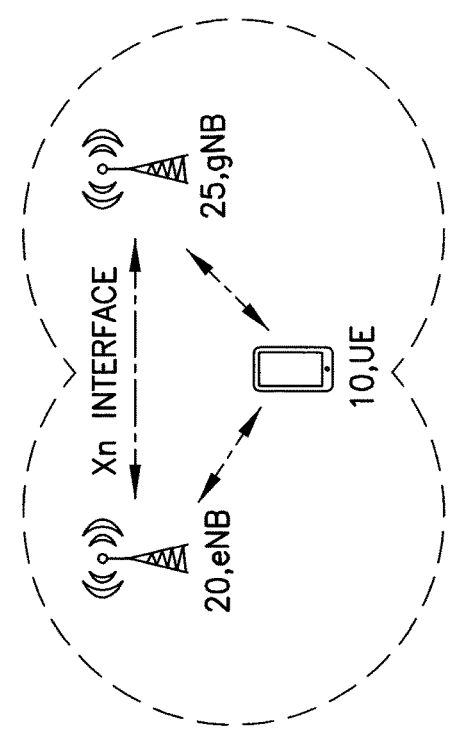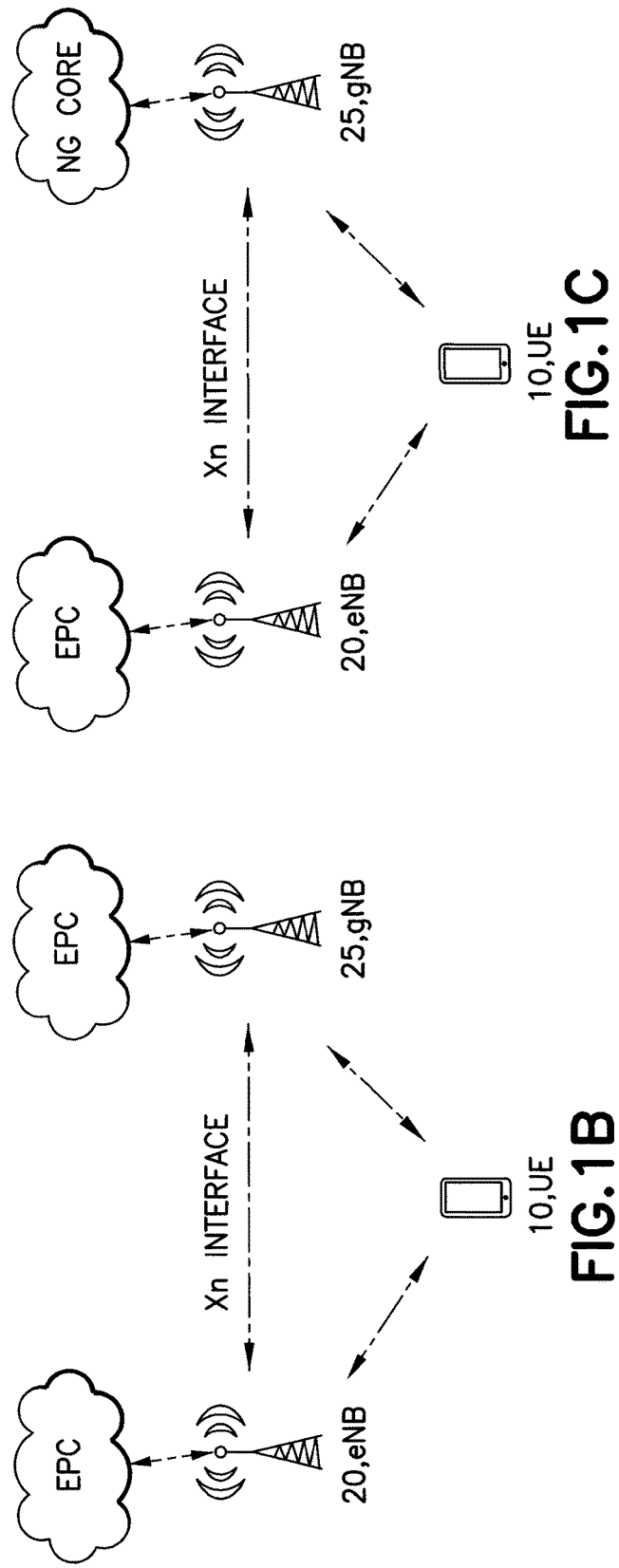

```
UE-EUTRA-Capability-v15xy-IEs ::= SEQUENCE {
    rf-Parameters-v15xy                           RF-Parameters-v15xy                        OPTIONAL,
    nonCriticalExtension                          SEQUENCE {}                                OPTIONAL
~~~
}

RF-Parameters-v15xy ::= SEQUENCE {
    supportedBandListEUTRA-v15xy                  supportedBandListEUTRA-v15xy               OPTIONAL,
    supportedBandCombination-v15xy                supportedBandCombination-v15xy             OPTIONAL,
    supportedBandCombinationAdd-v15xy             supportedBandCombinationAdd-v15xy          OPTIONAL,
    supportedBandCombinationReduced-v15xy         supportedBandCombinationReduced-v15xy      OPTIONAL
~~~
}

SupportedBandCombination-v15xy ::= SEQUENCE (SIZE (1..maxBandComb-r10)) OF
    BandCombinationParameters-v15xy SupportedBandCombinationAdd-v15xy ::= SEQUENCE (SIZE (1..maxBandComb-r11)) OF
    BandCombinationParameters-v15xy SupportedBandCombinationReduced-v15xy ::= SEQUENCE (SIZE (1..maxBandComb-r13)) OF
    BandCombinationParameters-v15xy SupportedBandCombinationReduced-v15xy ::= SEQUENCE (SIZE (1..maxBandComb-r13)) OF
    BandCombinationParameters-v15xy SupportedBandListEUTRA-v15xy ::= SEQUENCE (SIZE (1..maxBand)) OF SupportedBandEUTRA-v15xy SupportedBandListEUTRA-v15xy ::= SEQUENCE {
    IteIndex-r15                                  BandCombinationAdd-r15                     OPTIONAL,
    supportedNR-Combinations-r15                  SupportedNR-Combinations-r15               OPTIONAL
}
```

FIG.4A

PERFORMANCE INDICATOR FOR INTERWORKING RADIO ACCESS TECHNOLOGIES

RELATED APPLICATION

This application was originally filed as PCT Application No. PCT/FI2017/050937, filed on Dec. 27, 2017, which claims priority from U.S. Application No. 62/442,619, filed on Jan. 5, 2017.

TECHNOLOGICAL FIELD

The described invention relates to wireless communications, and more particularly to interworking among different radio access technologies (RATs) when serving a same user equipment (UE).

BACKGROUND

Acronyms used herein are listed below following the detailed description. The LTE radio access technology is commonly known as 4G and is deployed worldwide. While LTE continues to be improved such as via LTE-Advanced and HD voice, the 3GPP is developing a radical new RAT currently referred to as New Radio (NR) or 5G to meet ever increasing demand for wireless communications by increasingly varying types of user equipments. The 5G system may operate on multiple frequency bands, for example the mmWave frequency band, generally 6 GHz and higher (even up to 100 GHz), and is targeted to serve enhanced mobile broadband and massive machine-type communications with ultra-reliability and ultra low latency.

The stand-alone 5G system is targeted to be fully operational by 2020. In the interim it is expected to be deployed in various forms alongside the existing LTE infrastructure as a non-standalone technology. In this regard there is a need for a tight interworking between LTE and 5G systems where the 5G system is used in conjunction with LTE. One of the 3GPP's stated goals for this interworking is to keep LTE and 5G as independent as possible to allow parallel evolution of the different technologies, in part to better ensure networking equipment from different manufacturers will operate compatibly. FIG. 1A illustrates conceptually an example of such an interworking radio environment. There is an eNB 20 that is the radio access node operating with LTE technology and nearby there is a gNB 25 operating with 5G technology. In practice the gNB may be implemented as one or multiple remote radio heads operating in conjunction with a baseband unit located up to several kilometers away. The 5G infrastructure is not yet fully operational so the gNB 25 is operating in cooperation with the eNB 20, sharing information on what is currently termed a Xn interface which may be wired or wireless. There are many ways the eNB and gNB can cooperate to serve a UE. In one example the gNB is operating essentially as a secondary cell SCell for a given UE on a 5G frequency band and the eNB is serving that same UE as its primary cell PCell on a LTE frequency band. In another example the eNB hands over the UE to the gNB and the interworking ensures the gNB can continue handling the services the eNB is currently providing it. In another example gNB operates as a primary radio access point for a given UE, where the 5G RAN can: either independently operate with 5G Core (with mobility and interworking support with other RATs e.g. 4G, 3G, 2G) as indicated in the FIG. 1C or operate with 4G Core working in tandem with a 4G network (i.e. in the tight interworking mode (TI)), FIG. 1B.

If we assume the UE 10 is being served by the eNB 20 then the eNB 20 will know the UE's LTE capabilities, but it is not yet decided how or even if to coordinate that knowledge of the UE's LTE capabilities from the eNB 20 to the gNB 25. But since the eNB 20 and gNB 25 need to communicate via an interface to establish join operation for a UE, it is assumed that some interworking between the eNB 20 and gNB 25 exists. At this stage of development, it is not yet clear how either node knows whether tight interworking should be attempted for a given configuration, especially because the working assumption that the LTE and 5G systems are not required to understand/comprehend each other's capabilities means that neither can estimate a priori what is the expected performance of the UE operating under the other system. While the UE is under the eNB 20, the performance of the UE within the eNB 20 can be estimated from the UE feedback, but the eNB 20 may not know a priori what the UE performance under eNB 20 and gNB 25 would be since the eNB 20 doesn't know which NR configuration would be utilized. Further, in the above assumption the eNB is the serving cell meaning the eNB would typically choose its configuration before the gNB chooses its configuration. Since the eNB is not required to comprehend the gNB configuration, it is not clear how the eNB could decide whether the chosen gNB configuration fits the desired UE performance.

In wireless local area networks (WLANs) there is interworking with LTE and it has been suggested to introduce a throughput estimation metric for that scenario, in which either the WLAN access point estimates the UE's throughput and indicates it to the eNB (see for example document R2-165423 by Intel Corporation entitled *Considerations for additional WLAN metrics* [3GPP TSG-RAN WG2 Meeting #95; Gothenburg, Sweden; 22-26 Aug. 2016]) or the UE itself measures its WLAN throughput and indicates this to the eNB (see for example document R2-167528 by Nokia, Alcatel-Lucent and Shanghai Bell entitled *Throughput estimation measurement for WLAN* [3GPP TSG-RAN WG2 Meeting #96; Reno, USA; 14-18 Nov. 2016]).

With conventional LTE carrier aggregation the PCell is in charge of the overall configuration and there are no issues with the SCell coordination since all SCells are also operating with LTE and the PCell ensures the UE capabilities are not exceeded. In LTE when a UE is capable of dual connectivity operation, it is assumed the serving eNB (or LTE master node/MeNB) is able to comprehend the full capabilities of the UE, including the expected UE operation within the secondary node (or LTE SeNB), since everything happens within the LTE system. However, in the LTE-5G case the 5G capabilities of the UE are not relevant to the 4G eNB and the 4G eNB does not need to comprehend at least most of them; ideally the LTE eNB would not be required to be updated in hardware or software in order to interpret the 5G capabilities which may change rapidly in the early years of 5G adoption. With LTE DC, the secondary eNB (the primary SCell or PSCell which acts as the PCell for the SeNB) is allowed to choose its own configuration (within the limits imposed by the master eNB/MeNB or PCell), but the master eNB still always comprehends the entire secondary eNB configuration and can therefore judge whether the configuration given by any given secondary eNB provides the expected performance.

Embodiments of these teachings resolve the above issues by providing an interworking framework by which the LTE and 5G access nodes, or the access nodes of any two different RATs for that matter, can exchange information by which they can assess whether a tight interworking relation between them is appropriate for a given UE.

SUMMARY

According to a first aspect of these teachings there is a method comprising: determining that a user equipment (UE) can support operation on a given radio band combination comprising a first radio band operating with a first radio access technology (RAT) and a second radio band operating with a second RAT; using a performance capability of the UE to obtain at least a second configuration for the second radio band operating with the second RAT; and configuring the UE with the interworking configuration, the interworking configuration comprising a first configuration to operate on the first band with the first RAT and a second configuration to operate on the second band with the second RAT.

According to a second aspect of these teachings there is a computer readable memory storing computer program instructions that, when executed by one or more processors, cause a host device, such as for example a master radio access node operating with a first RAT, to perform actions comprising: determining that a UE can support operation on a given radio band combination comprising a first radio band operating with a first RAT and a second radio band operating with a second RAT; using a performance capability of the UE to obtain at least a second configuration for the second radio band operating with the second RAT; and configuring the UE with the interworking configuration, the interworking configuration comprising a first configuration to operate on the first band with the first RAT and a second configuration to operate on the second band with the second RAT.

According to a third aspect of these teachings there is an apparatus comprising at least one computer readable memory storing computer program instructions and at least one processor. The computer readable memory with the computer program instructions is configured, with the at least one processor, to cause the apparatus to perform actions comprising:
determining that a UE can support operation on a given radio band combination comprising a first radio band operating with a first RAT and a second radio band operating with a second RAT; using a performance capability of the UE to obtain at least a second configuration for the second radio band operating with the second RAT; and configuring the UE with the interworking configuration, the interworking configuration comprising a first configuration to operate on the first band with the first RAT and a second configuration to operate on the second band with the second RAT.

BRIEF DESCRIPTION OF THE DRAWINGS

FIG. 1A-C are schematic diagrams illustrating example radio environments in which embodiments of these teachings may be practiced.

DETAILED DESCRIPTION

Figure 2:
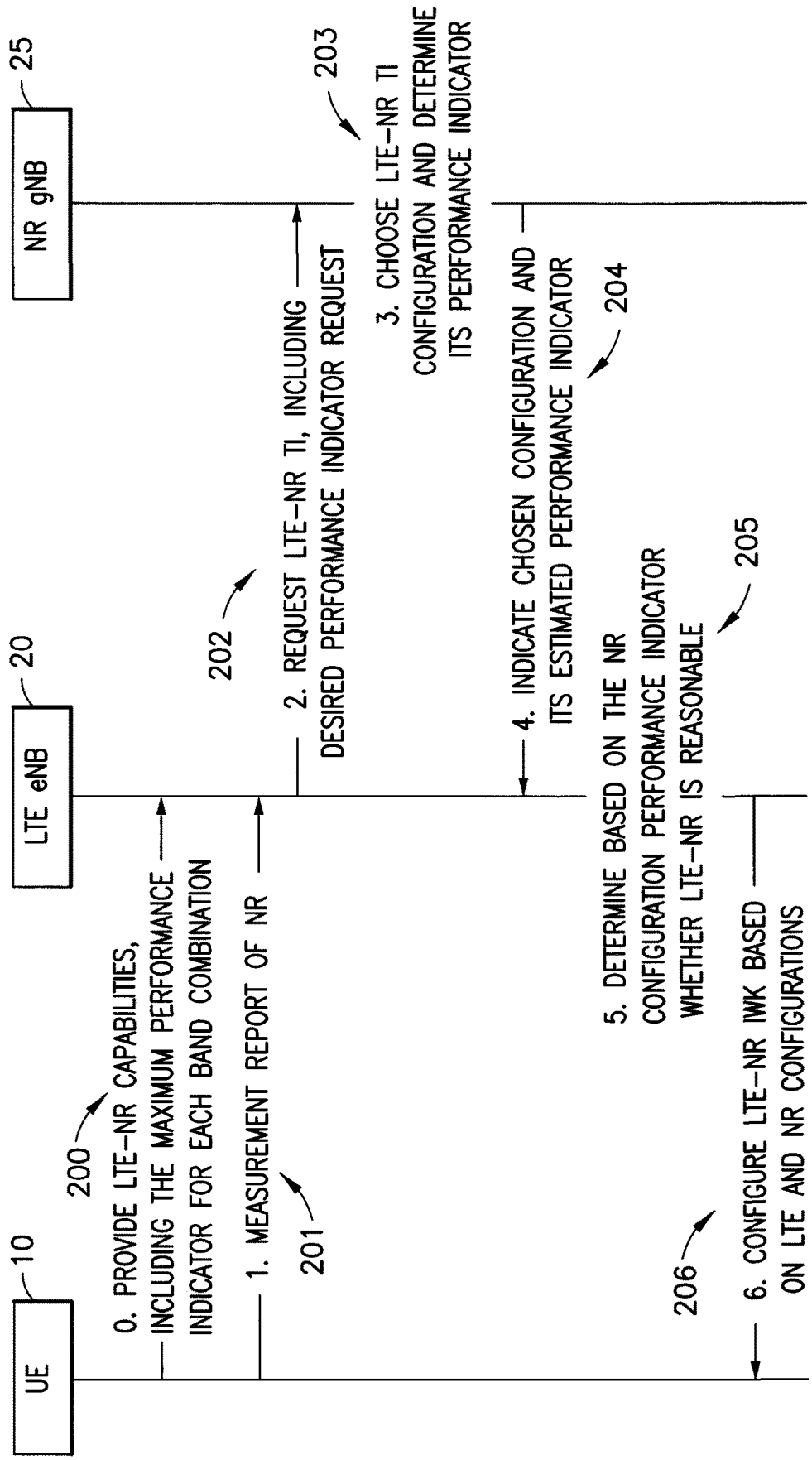
FIG. 2 is a signaling diagram illustrating signaling between a UE and the access nodes of two different RATs for providing a performance indicator for configuring interworking according to certain embodiments of these teachings.

One important feature necessary to fully understand the advantages of the teachings herein is that the described performance indicator is used initially to decide whether the two different RATs should establish an interworking to serve a given UE. It would be inefficient if an interworking configuration was established each and every time there was a dual-capable UE in the presence of access nodes from the two different RATs for which it is capable, because in some if not many instances practical constraints may prevent any gains in UE throughput being realized from inter-RAT interworking. While the examples described below conclude with an interworking configuration being established and implemented in order to serve a given UE, in some instances the described process will conclude that interworking is not suitable for this particular UE at this particular time in which case no interworking will be established for it.

With this in mind, embodiments of these teachings provide an expected, estimated and measured performance indicator of LTE-5G configuration. There is also a maximum performance indicator that tells of the UE's capabilities; the expected performance indicator is based on that indicated maximum performance. The expected and estimated performance indicators are used in the initial decision process whether to establish LTE-5G interworking and are described below with reference to FIG. 2. The measured performance indicator is used after an interworking relationship (configuration) is established and aids in keeping that already-established interworking configuration optimized; example signaling diagrams for this are detailed below with reference to FIGS. 3A-C. The expected and estimated performance indicators allows both the eNB and gNB to understand what is the anticipated performance of each system when configuring for LTE-5G interworking, and the measured performance indicator is to ensure the interworking configuration that is established fully serves the UE or needs adjusting, for example as radio conditions change the estimated performance may no longer hold true.

As mentioned above, while the examples herein assume LTE and 5G interworking, these RATs are only a specific example of any two divergent RATS for which the broader aspects of these teachings can be deployed, and are thus representative of any first RAT and second RAT. When initially deployed prior to the entire infrastructure being in place the 5G cells are to be non-standalone, and so the examples below assume the eNB is in the position of the master node/master cell serving the UE and the gNB is in the position of the secondary node/secondary cell which provides some service or services to the UE via the 5G side of the LTE-5G interworking configuration. This assumption as to which is the master versus secondary node is also non-limiting to the broader teachings herein.

In an embodiment, when the master node requests a tight interworking configuration from the secondary node the master node also indicates a level of expected performance from the secondary node, and in reply the secondary node indicates the estimated performance when indicating its chosen configuration. The master node's indication of expected performance is based on information about the master node's own UE capabilities for the RAT controlled by the master node; that RAT is LTE in this example.

FIG. 2 is an example signaling diagram for setting up a tight interworking configuration initially, and reflects an overview of the process. First the master node/eNB 20 learns from the UE 10 itself the UE capabilities at message 200 of FIG. 2. Within the set of UE capabilities in this message 200 there are LTE and 5G band combinations that the UE is able to support; there may be only a single band combination or there may be multiple band combinations listed for which the UE is capable of LTE-5G. For each LTE-5G band combination in a given UE's capability list within this message 200, there may be an implicit or explicit indication of the maximum performance for at least the other RAT pertaining to that particular band combination. It indicates maximum performance because it reflects the UE's capabilities for the 5G band of that particular band combination.

In some embodiments there will also be a separate indication of the maximum performance for both RATs. This is not always necessary though because it is assumed the eNB will know the UE's capability on the LTE band of any given band combination via prior art techniques, such as acquiring these LTE capabilities of the UE when the UE first establishes a connection with it. So for example if the maximum performance indicator is throughput and is selected from among the set {low, medium, high}, in one embodiment the UE capabilities message 200 can indicate LOW for the 5G band of a given band combination and have no indication of the UE's performance capability for the LTE band, while in another embodiment the UE capabilities message 200 can indicate LOW for the 5G band and MEDIUM for the LTE band of a given band combination.

In one implementation, assume an indexed description table of LTE-5G band combinations that is specified in a published radio interworking standard (so that UE and the eNB and the gNB can know in advance without signaling the table what bands are referenced by each index). Instead of low, medium and high, the maximum performance indicator may be an index into that table and the corresponding table entry contains detailed parameters describing the performance of the configuration of the other RAT (which in this example is 5G). In a particular but non-limiting embodiment of such a table the more detailed information that is identified by the maximum performance indicator/index is an enumeration indicating the corresponding performance of the other/target RAT (5G in this example) in terms of pre-defined thresholds such as minimum signal strength thresholds necessary for handing over to the 5G system. In a further detailed embodiment the description table may be populated with entries which may also be service specific or network specific, so for example for the same LTE-5G band combination there may be one throughput minimum for MBSFN (which is one a particular service) on the 5G band and a different throughput minimum for augmented reality (a different service) on the 5G band. In another detailed embodiment, for optimal network slicing, the parameters determine UE capability information that indicate expected level of performance specifically on preferred 5G band combinations, i.e. the performance indicator is a determinant for a minimum or maximum performance in terms of a specific service being achievable on a dedicated carrier for a slice (eMBB, URLLC, dedicated frequency etc.)

When the master node/eNB 20 requests LTE-5G tight interworking of the secondary node/gNB 25 via message 202, the eNB 20 uses the UE capability information from message 200 to determine whether a given tight interworking band combination can meet the expected performance. So for example assume the UE supports only the band combination LTE-band-A and 5G-band-B and is capable of a given maximum performance level for one or both of those bands, and further assume this UE 10 needs augmented reality services. The eNB can consult the table and find whether the 5G-band-B can meet the throughput requirements for virtual reality services, within the maximum performance capabilities of the UE for this 5G band which the eNB learns from message 200, and choose to proceed or not with the tight interworking establishment. If we assume there is a different performance table for each different band combination, the UE might indicate the band combination(s) it supports via a table index, and if that table has further granularity for services/networks the performance index for that band-combination table will be further associated with the specific service or network for which tight interworking is being established for this band combination. If there are multiple supported band combinations that can support the service/network the master node/eNB 20 will indicate all of these (for example by identifying the corresponding table indices) in its tight interworking request to the secondary node/gNB, as well as the performance indications needed to support the UE (for augmented reality service in this example).

Assuming that after consulting the proper table the master node/eNB 20 decides that the other RAT's band from the UE's supported band combination can support this UE, the master node/eNB 20 will determine an expected performance metric for operation on the 5G band. For example if the eNB 20 would like to offload the UE's current or requested augmented reality session to the gNB 25, this expected performance metric may be a minimum throughput that is needed to support that augmented reality session. When the master node/eNB 20 decides that tight interworking may be suitable for this UE it indicates to the secondary node/gNB, with an explicit query within the LTE-5G interworking request 202 at FIG. 2, what is the expected performance the secondary node is to satisfy. The interworking request 202 may include the master node's/eNB's first configuration it is using with this UE 10 for operation on the LTE system. In some implementations the master node/eNB 20 will consult a local cache containing the mapping between the maximal performance index of the UE's message 200 and the descriptor table that tells what performance will be needed from the other RAT band. This local cache may be refreshed periodically based on an explicit query between the LTE and the 5G nodes using network management (e.g. ANR based on reported UE measurements stored within the LTE and/or 5G nodes) mechanisms so that the master node/eNB 20 can know which bands are supported by its nearby secondary node/gNB 25, and at what throughput or other levels of performance, even before the master node/eNB 20 sends an interworking request 202. This refresh accounts for the possibility that the non-standalone gNBs 25 that are initially deployed may not all support identical sets of 5G bands and may operate under different conditions depending on e.g. time of day or traffic conditions. The stored information on network conditions enables the eNB to understand what configurations are possible in view of changing radio conditions and what frequencies may be active or not at different times so the eNB can judge whether or not even to consult the gNB with some performance indication over the Xn interface.

Now with the tight interworking request 202 from the master node/eNB 20, the secondary node/gNB 25 uses the LTE configuration from the master node 20 and the expected performance indicator within that request 202 to determine at step 203 which of its own RAT configurations to choose. In this regard the secondary node/gNB 25 chooses the 5G configuration it can support that will meet the expected performance requirements (from the interworking request) on the 5G band. In some embodiments the master node/eNB 20 need not provide its own LTE configuration to the secondary node/gNB 25 in the tight interworking request 202, but the FIG. 2 example has the secondary node 25 choosing the interworking configuration at block 203, and this interworking configuration includes both the LTE configuration decided by the master node 20 and the 5G configuration decided by the secondary node 25.

Regardless, the secondary node/gNB 25 accepts the tight interworking request by replying via message 204 of FIG. 2 to the master node/eNB 20 with some indication of at least the 5G configuration it chooses, and this message 204 includes an indication of the estimated performance it will support for at least that 5G configuration. If this message 204 has the interworking configuration the estimated performance may be for the overall dual-RAT configuration or it may be for only the 5G portion of that configuration.

As one example for how the expected and estimated performance metrics may differ, if these performance metrics are in terms of throughput and as above the eNB 20 is seeking to offload the UE's augmented reality session to the gNB 25, the master node/eNB 20 may add some margin to the minimum throughput requirement when deciding the value for the expected performance metric it will send in the interworking request message 202. If the gNB 25 cannot quite satisfy that expected performance metric it may include in its reply message 204 the estimated performance metric for the 5G operation that the eNB may still find to be acceptable for its decision at block 205 of FIG. 2, for example if the difference between the values of the expected and estimated throughputs is less than the margin that the eNB added over the minimum throughput for augmented reality services. Thus the values of the expected and estimated performance metrics may be different, though sometimes they may be the same if the secondary node/gNB 25 agrees simply to satisfy the expected performance metric it received from the master node/eNB 20.

Assuming the master node/eNB 20 considers the interworking configuration and the estimated performance metric that it learns from message 204 to be reasonable in the master node's/eNB's decision at block 205 of FIG. 2, in view of the master node's/eNB's own LTE configuration for this UE 10, the master node/eNB 20 then configures the UE 10 with a LTE-5G interworking configuration via message 206 of FIG. 2. As detailed above this LTE-5G interworking configuration is a combination of:

the LTE configuration decided by the master node/eNB 20; and
the 5G configuration decided by the secondary node/gNB 25 and communicated to the master node/eNB 20 via message 204.

The LTE configuration can be decided by the master node prior to the interworking request 202 in which case it would include that configuration in that request 202, or after receiving the second configuration in message 204 if the secondary node 25 chooses at block 203 only its own 5G configuration rather than the overall interworking configuration that FIG. 2 shows. The 5G configuration as well as the LTE configuration is part of the interworking configuration.

In the FIG. 2 example the secondary node takes the LTE configuration it receives in the interworking request and decides the overall interworking configuration, which it sends in message 204. In another embodiment the master node decides the overall interworking configuration at block 205 of FIG. 2, in which case the secondary node 25 need only choose its own 5G configuration at block 203 which it sends to the master node at message 204. In any case message 204 has at least the chosen 5G configuration.

In FIG. 2 the UE 10 is shown as providing a measurement report 201 of the new radio/5G system to the master node/eNB 20. This initial measurement report 201 can be used by the master node/eNB 20 in first assessing whether conditions on the UE's supported LTE channel are even sufficient to proceed further with the decision process in setting up the tight interworking. For example if the LTE channel conditions are deteriorating the master node/eNB 20 may decide the UE 10 will soon be handed over to another LTE cell and time is too short to set up a LTE-5G interworking. As another example if the LTE channel conditions are deteriorating and time is not too short the master node/eNB 20 may decide to set up the LTE-5G interworking for the purpose of handing over the UE 10 to the gNB cell.

Figure 3A:
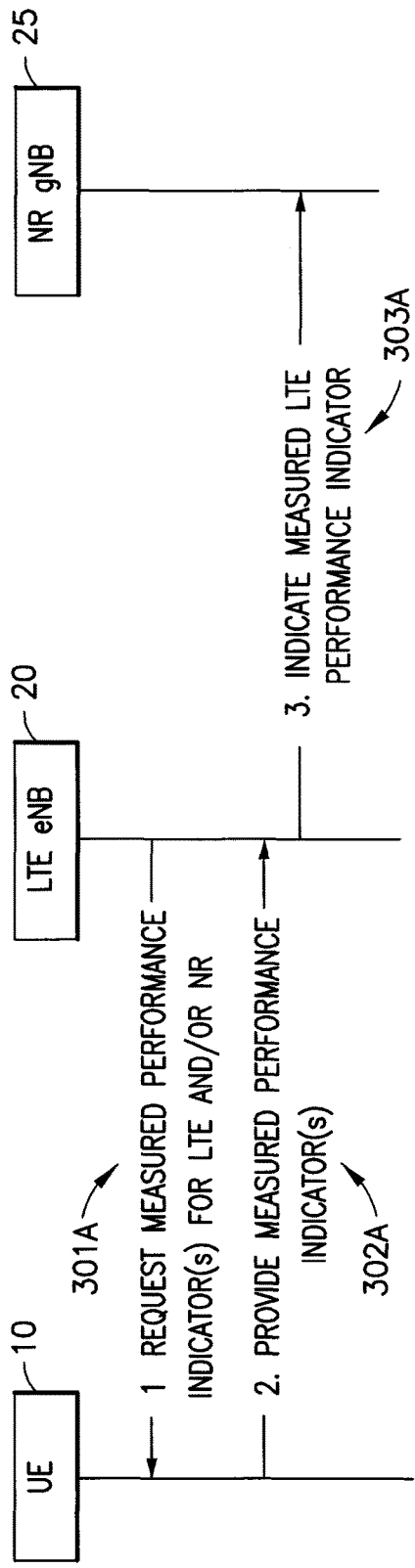
FIGS. 3A-C are signaling diagrams illustrating signaling for updating status of the performance indicator such as the expected or estimated performance indicators at FIG. 2, according to different embodiments of these teachings.
Figure 3B:
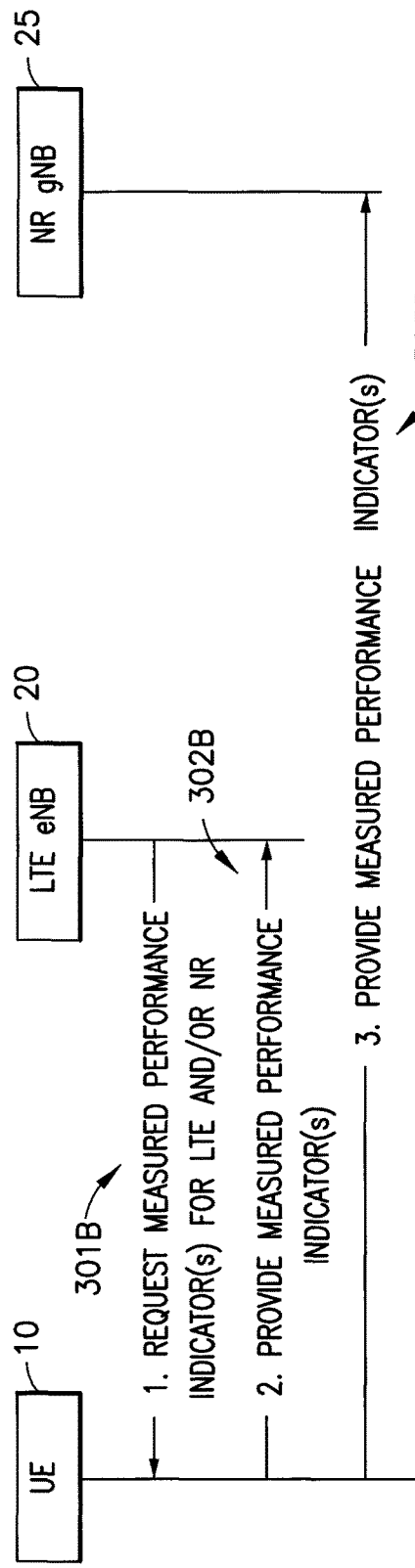
Figure 3C:
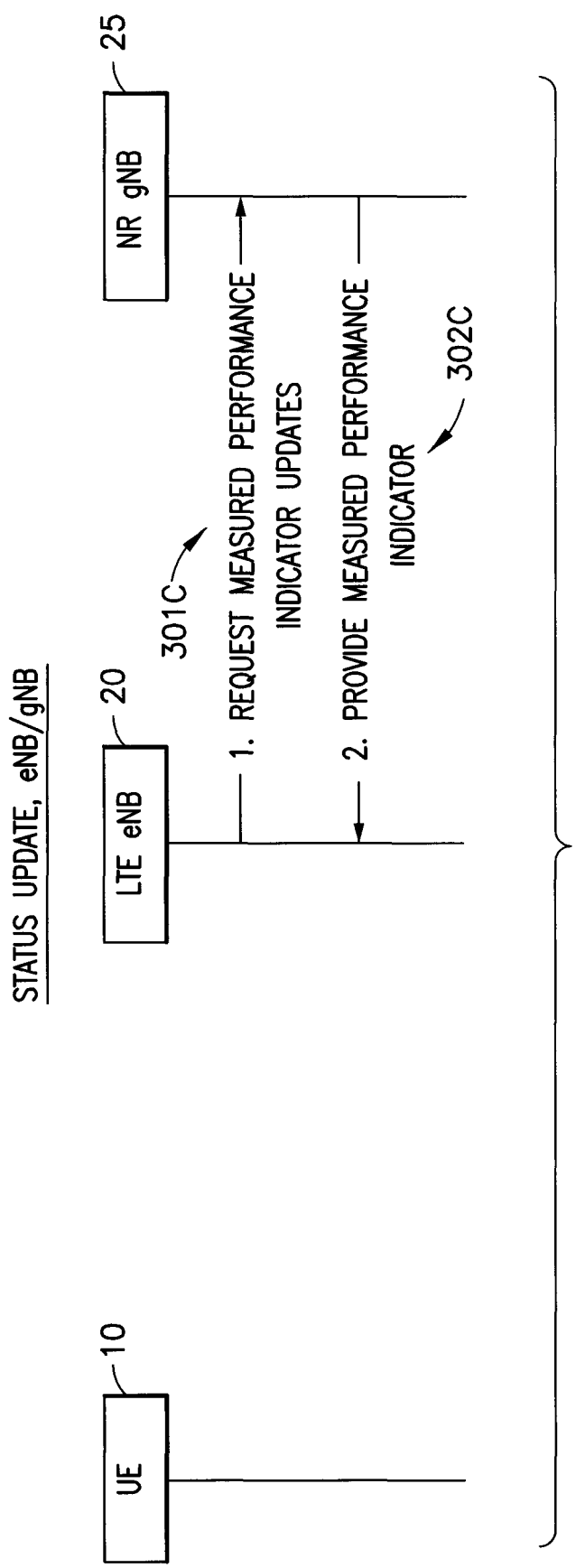

Once the interworking is configured to the UE 10 and the other RAT/5G system is providing services to the UE 10, the master eNB 20 can configure the UE 10 to also send performance measurement reports of the other RAT (5G) to the UE's serving RAT (LTE), and/or to provide directly to the secondary node/gNB 25 performance measurement reports of the serving RAT (LTE) or of both RATs (LTE and 5G). FIGS. 3A-C present some non-limiting signaling diagrams for such indications of measured performance, with no UE involvement at FIG. 3C. Both the master node/eNB 20 and the secondary node/gNB 25 can request periodic updates of measured performance of the UE 10 for the purposes of monitoring how well the LTE-NR configuration is performing. Since each node 20 can measure throughout for this UE in their own system the greater advantages are realized when one node gets measured performance of the other RAT. Once the tight interworking is configured both the master node/eNB 20 and the secondary node/gNB 25 may cache configuration updates in anticipation of any changes to these measured performance indicators. The resulting configurations pertaining to these anticipated changes may refer to default configurations or configurations freshly generated by these nodes. So for example if the master node/eNB 20 decides for the interworking request message 202 at FIG. 2 that the expected throughput for augmented reality services on 5G-band-B should be a minimum value X but sees from the measured performance it learns that this is not being met, the master node/eNB 20 can conclude this is due to an excessive error rate and update its minimum throughput needed to support augmented reality services on 5G-band-B to some higher minimum.

FIG. 3A is a signaling diagram in which the UE 10 provides a status update to the master node/eNB 20. The master node/eNB 20 requests it at message 301A and this request can be for an individual update or periodic updates. In reply to this request 301A the UE measures the performance on the requested RAT (LTE and/or 5G) and provides the corresponding indicator(s) to the master node/eNB 20 at message 302A. The master node/eNB 20 can provide to the secondary node/gNB 25 the measured performance indicator for its own RAT (LTE) via message 303A.

FIG. 3B is similar to FIG. 3A in that messages 301B/302B at FIG. 3B are substantially similar to respective messages 301A/302A at FIG. 3A. But in FIG. 3B the UE 10 additionally provides the secondary node/gNB 25 with the measured performance indication(s) directly via message 303B.

FIG. 3C is a signaling diagram with signaling entirely between the different RAT access nodes 20, 25. One node 20 requests measured performance indicator updates at message 301C and the other node 25 provides them in reply via message 302C. In this regard the measured performance indicators may be generated by one of the nodes 20, 25 itself, or it may be generated by the UE 10 and communicated to that node 20, 25 such as via FIG. 3A where message 303A of FIG. 3A is in the position of message 302C of FIG. 2 and is only sent if the secondary node/gNB 25 has previously sent a request to the master node/eNB 20 like message 301C of FIG. 3C. However the signaling is implemented, the measured performance indicator is updated to each RAT and these updates are dynamic to reflect changing channel conditions. As above, comparing these measured performance indicators to the performance estimated from the interworking configuration given at message 206 of FIG. 2 can be used to update local caches at the eNB and gNB that are used to determine the expected and estimated performance metrics when a tight interworking is set up in the future.

Figure 4B:
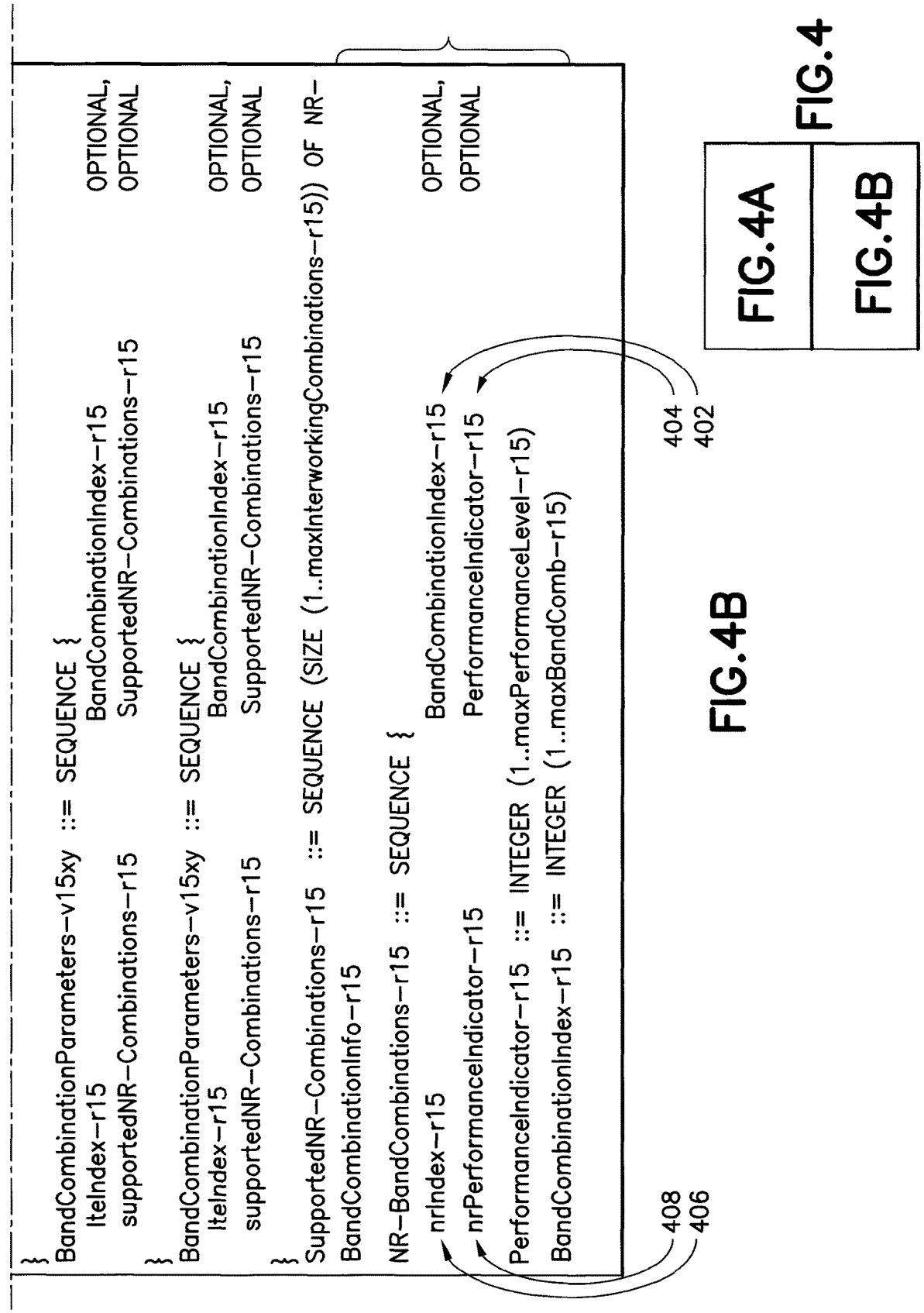
FIG. 4 is a table showing contents of an UE-EUTRA capability information element as modified with additional information according to an embodiment of these teachings.

FIG. 4 is an adaptation of a prior art UE-EUTRA Capability information element that conventionally is sent by the UE to the LTE radio access node. According to the teachings herein it is sent by the UE 10 to its serving radio access node which operates as the master node; more specifically in message 200 of FIG. 2 that the UE 10 sends to the eNB 20 in the above examples. This information element as shown at FIG. 4 is adapted to include:

a list of each band combination supported by the UE (each combination with a band in a first RAT and a band in a second RAT different from the first RAT); and for each listed band combination, an indication of the UE's maximum performance level.

The bracket at FIG. 4 identifies these elements for one particular band combination: there is an index for the band combination 402; a performance indicator 404 that indicates the UE's maximum performance capability for that band combination; an index for the 5G band (new radio NR, specifically "nr" in FIG. 4) 406, and a performance indicator 408 that indicates the UE's maximum performance capability for only that 5G band.

Figure 5:
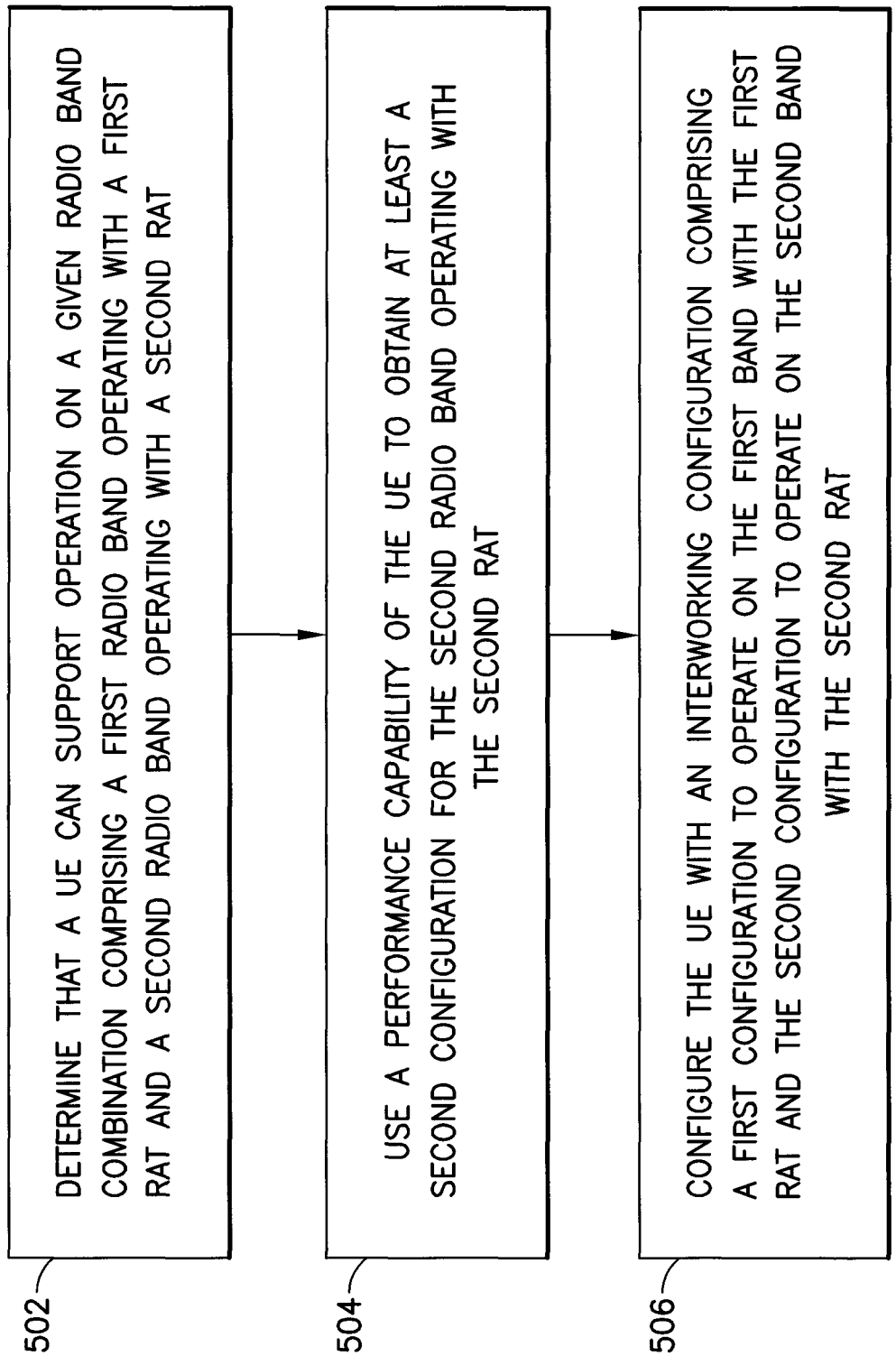
FIG. 5 is a process flow diagram summarizing certain of the above teachings from the perspective of the master radio access node such as the eNB 20 of FIG. 2.

FIG. 5 is a process flow diagram that summarizes some of the above aspects from the perspective of the master radio access node, which in the above examples is the UE's serving radio access node the eNB 20. FIG. 5 details a method for operating such a master node for configuring a UE with an interworking configuration. FIG. 5 is in terms of first and second RATs, which in the above examples are the respective LTE and 5G radio access technologies. At block 502 the master node determines that a UE can support operation on a given radio band combination, where the radio band combination comprises a first radio band operating with a first RAT and a second radio band operating with a different second RAT. Message 200 of FIG. 2 provides the information for the master node to determine this. Block 504 of FIG. 5 has the master node using a performance capability of the UE to obtain at least a second configuration for the second radio band operating with the second RAT, which FIG. 2 breaks down into blocks 202, 204 and 205. An interworking configuration includes this second configuration, at block 506 of FIG. 5 the master node configures the UE with the interworking configuration that comprises a first configuration to operate on the first band with the first RAT and the second configuration to operate on the second band with the second RAT, as described above for message 206 of FIG. 2.

In the above non-limiting examples the first RAT is E-UTRA technology and the second RAT is 3GPP NR/5G radio access technology, the master radio access node performing the process of FIG. 5 is operating with the first RAT and it provides the first configuration to a secondary access node operating with the second (NR/5G) RAT, and further the master radio access node obtains the interworking configuration from the secondary access node, where block 506 makes clear the interworking configuration comprises the second configuration as well as the first configuration.

In a specific embodiment the determining at block 502 comprises receiving from the UE a message such as message 200 of FIG. 2 that identifies the given radio band combination and an indicator such as 408 of FIG. 4 of the performance capability of the UE, where the indicator indicates the performance capability of the UE on at least the second RAT. In some deployments this message that the master node receives from the UE includes two indicators of the performance capability of the UE, one of which indicates the performance capability of the UE on the second RAT and the other of which indicates the performance capability of the UE on the first RAT.

One way the master node can use the performance capability of the UE to obtain at least the second configuration at block 504 of FIG. 5 is to first use the performance capability of the UE to determine an expected performance metric for operation on the second RAT such as via the description table detailed above, and thereafter send to the secondary radio access node operating with the second RAT a request such as the interworking request 202 of FIG. 2 for the interworking configuration. As detailed above this request identifies or otherwise has some indication of the expected performance metric, and in some embodiments this request further indicates the first configuration for the first radio band operating with the first RAT. As detailed above for message 204 of FIG. 2, the master node can receive the interworking configuration from the secondary radio access node along with an estimated performance metric for operation on the second RAT at least.

In some embodiments, after configuring the UE at block 506 with the interworking configuration, the master node can receive from the UE an indication of measured performance on the second RAT as in FIGS. 3A-B; and/or it can send to the secondary radio access node which provided the second configuration a request for at least one indication of measured performance on the second RAT as in FIG. 3C. In this regard the master node can utilize these UE measurement results to adjust the expected performance indicator(s) it uses, based on radio conditions.

The master node can determine whether even to request interworking (message 202 of FIG. 2) based on the expected performance indicator/metric. If the UE's capabilities message 200 of FIG. 2 lists multiple band combinations the master node can utilize the expected performance indicators of each band combination to determine which band combination(s) to choose as candidates for interworking, and include all those candidates in its request message 202. Note that while the above examples have the interworking request 202 including the master node's expected performance metric, in some embodiments this metric does not need to be in the master node's request itself. In a specific embodiment, the master node can determine, based on the estimated performance metric, whether to accept the interworking configuration from the secondary node.

Further, the master node can provide the measured performance indicator to the gNB (FIG. 3A), can request measured performance indicator updates from the gNB (FIG. 3C), and/or can provide combined UE capabilities for multiple interworking band combinations that the UE supports (message 202 of FIG. 2).

From the perspective of the UE 10, in one embodiment the UE indicates the expected maximum throughput of each LTE-NR band combination within its capabilities for both RATs. In a particular embodiment these throughput indications are separated for each RAT; that is, one metric is provided for each system. Alternatively, the LTE band combination only indicates the other RAT (NR/5G) performance and vice versa; since each system fully comprehends its own capabilities, only information from the other system is needed for the decision-making.

In another embodiment detailed above the UE 10 indicates a performance indicator for each LTE-NR band combination that is within its capabilities for both LTE and NR. For example, this indicator states whether the band combination provides low, medium or high UE performance for the band combination. Similarly a separate indicator may be provided for each system so for example LTE could have low performance while NR/5G has high performance.

In another embodiment the UE 10 indicates within its capabilities for interworking band combinations further LTE-band indicators (or group indicators) that might contribute to the performance assessment, for example the UE's multiple-input multiple-output (MIMO) capabilities, channel state information (CSI) processes, modulation scheme (64QAM, 256QAM), physical layer parameters implied by the UE category such as maximum number of supported layers for special multiplexing in downlink and uplink, maximum number of transport block bits received within a transmission time interval, and the like. This may be implemented with simplified factor(s) that in a representative manner provide to the master node some information on anticipated performance. Similar combination group indicators can be provided for the NR/5G band that provide information on performance level, and for example the simplified factors can provide information on the UE's capabilities for a range or subset of carriers.

In another embodiment the UE 10 can indicate within its capabilities for an interworking band combinations message 200 what is its maximum allowed configuration, for example in terms of number of bands with corresponding physical layer characteristics that corresponds to the maximum level of performance. In another embodiment the UE 10 can indicate suitability of the configuration for the desired vertical use case, for example enhanced mobile broadband (eMBB), ultra-reliable and low latency communications (URLLC), and massive machine-type communications (mMTC).

From the perspective of the secondary node (the gNB 25 in the above examples), in some embodiments the gNB receives a requested/expected performance indicator together with LTE-NR TI configuration request. In a more particular embodiment the gNB utilizes this performance indicator to decide whether LTE-NR TI is feasible with the given configuration/band combination choices.

In another embodiment the gNB indicates the expected performance indicator when accepting or rejecting LTE-NR TI request from eNB, but in the examples above this is termed an estimated performance indicator since the interworking might still proceed even if the gNB cannot quite support the eNB's requested/expected performance metric.

In another embodiment the gNB can query the eNB for combined UE capabilities for one or more possible interworking band combinations, and in a related embodiment it can receive the combined UE capabilities for one or more interworking band combinations over an interface with eNB. As an example the gNB can do this during handover preparation.

In another embodiment the gNB 25 provides a measured performance indicator to the eNB, and further/alternatively it can request measured performance indicator updates from the eNB.

Various of these aspects may be practiced individually or in any of various combinations. While the above description of FIG. 5 is from the perspective of the master radio access node 20, the skilled artisan will recognize that these support corresponding behavior on the part of the UE 10 and the secondary radio access node 25, some of which are summarized above.

Figure 6:
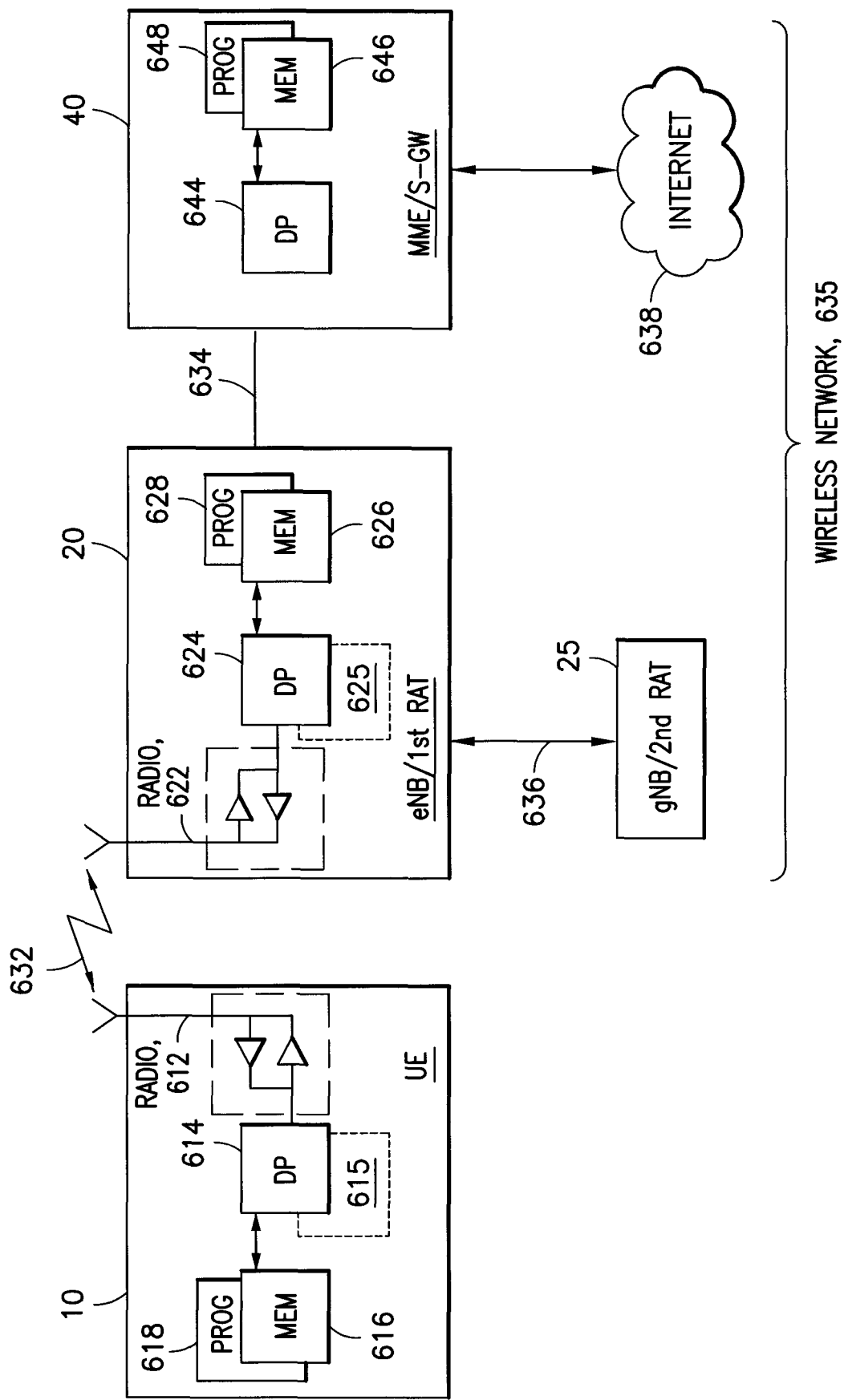
FIG. 6 is a high level schematic block diagram illustrating certain apparatus/devices that are suitable for practicing certain of these teachings.

FIG. 6 is a high level diagram illustrating some relevant components of various communication entities that may implement various portions of these teachings, including a master radio network access node shown in FIG. 6 as an eNB 20 that is operating on a first RAT and which is further in communication with a mobility management entity (MME) which may also be co-located with a serving gateway (S-GW) 40. FIG. 6 further shows a user equipment (UE) 10, and a secondary radio network access node shown in FIG. 6 as a gNB 20 that is operating on a second RAT different from the first RAT. In the wireless radio environment of FIG. 6 a communications network operating with the first RAT is adapted for communication over a wireless link 632 with an apparatus, such as a mobile communication device which may be referred to as a UE 10, via the eNB 20. The network operating on the first RAT may include a MME/Serving-GW 40 that provides connectivity with other and/or broader networks such as a publicly switched telephone network and/or a data communications network (e.g., the internet 638).

The UE 10 includes a controller, such as a computer or a data processor (DP) 614 (or multiple ones of them), a computer-readable memory medium embodied as a memory (MEM) 616 (or more generally a non-transitory program storage device) that stores a program of computer instructions (PROG) 618, and a suitable wireless interface, such as radio frequency (RF) transceiver or more generically a radio 612, for bidirectional wireless communications with the radio network access node 20 via one or more antennas. In general terms the UE 10 can be considered a machine that reads the MEM/non-transitory program storage device and that executes the computer program code or executable program of instructions stored thereon. While each entity of FIG. 6 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices having wireless communication capabilities, including smartphones, wireless terminals, portable computers, image capture devices, gaming devices, music storage and playback appliances, Internet appliances, machine-type communication devices, vehicle-mounted internet devices, smart-home/Internet-of-Things type devices, as well as portable units or terminals that incorporate wireless communications capabilities.

The eNB 20 also includes a controller, such as a computer or a data processor (DP) 624 (or multiple ones of them), a computer-readable memory medium embodied as a memory (MEM) 626 that stores a program of computer instructions (PROG) 628, and a suitable wireless interface, such as a RF transceiver or radio 622, for communication with the UE 10 via one or more antennas. The eNB 20 is coupled via a data/control path 634 to the MME 40. The path 634 may be implemented as an S1 interface. The eNB 20 may also be coupled to other radio network access nodes operating with the first RAT such as via an X5 interface.

The eNB 20 may further be coupled to a secondary node such as the gNB 25 operating with a different second RAT via a data/control path 636 which may be implemented as a wired or wireless Xn interface. Relevant components of the gNB 25 are substantially similar to those detailed for the eNB 20 and so are not repeated, except to note that the gNB 25 operates at much higher frequencies, typically will have a much higher number of antennas, and is anticipated to be dispersed in that the antennas are disposed at remote radio heads (RRHs) that are remote from the baseband processing functionality (one or more baseband units BBUs). Both the RRHs and the BBUs will each have their own data processor DP and computer-readable memory MEM storing programs of computer instructions PROGs, but the majority of memory and processing capability is to be in the BBUs of the gNB 25.

Referring again to the first RAT/LTE system, the MME 640 includes a controller, such as a computer or a data processor (DP) 644 (or multiple ones of them), a computer-readable memory medium embodied as a memory (MEM) 646 that stores a program of computer instructions (PROG) 648.

At least one of the PROGs 618, 628 (and also in the gNB 25) is assumed to include program instructions that, when executed by the associated one or more DPs, enable the device to operate in accordance with exemplary embodiments of this invention. That is, various exemplary embodiments of this invention may be implemented at least in part by computer software executable by the DP 614 of the UE 10; and/or by the DP 624 of the eNB 20 or of the gNB 25; and/or by hardware, or by a combination of software and hardware (and firmware).

For the purposes of describing various exemplary embodiments in accordance with this invention the UE 10 and the eNB 20 may also include dedicated processors 615 and 625 respectively. There may also be dedicated processors in either or both of the RRHs and the BBUs of the gNB 25.

The computer readable MEMs 616, 626, 646 and also of the gNB 25 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 614, 624, 644 and also of the gNB 25 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 612 and 622 and of the gNB 25) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

The following abbreviations that may be found in the specification and/or the drawing figures are defined as follows:
   3GPP Third Generation Partnership Project
   ANR Automatic Neighbor Relation
   DC Dual Connectivity
   E-UTRA evolved UMTS terrestrial radio access
   L3 layer 3 (radio resource control/non-access stratum in E-UTRAN)
   LTE long term evolution (of E-UTRAN)
   NR new radio (also known as $5^{th}$ Generation or 5G)
   RAN radio access network
   RAT radio access technology
   UMTS universal mobile telecommunications service

What is claimed is:

1. A method comprising:
   determining that a user equipment is configured to support operation on a given radio band combination comprising a first radio band operating with a first radio access technology and a second radio band operating with a second radio access technology;
   determining that the second radio band operating with the second radio access technology is configured to support the operation of the user equipment with the given radio band combination, and using a performance capability of the user equipment to obtain at least a second configuration for the second radio band operating with the second radio access technology in response to the determining; and
   configuring the user equipment with an interworking configuration, the interworking configuration comprising a first configuration to operate on the first radio band with the first radio access technology and the second configuration to operate on the second radio band with the second radio access technology.

2. The method according to claim 1, wherein the first radio access technology is evolved universal mobile telecommunications service terrestrial radio access technology and the second radio access technology is third generation partnership project new radio or 5th generation radio access technology.

3. The method according to claim 2, wherein:
   the method is performed with a master radio access node operating with the first radio access technology, the master radio access node transmits the first configuration to a secondary access node operating with the second radio access technology; and
   the master radio access node receives the interworking configuration from the secondary access node.

4. The method according to claim 1, wherein:
   determining that the user equipment is configured to support operation on the given radio band combination comprises receiving from the user equipment a message identifying the given radio band combination and an indicator of the performance capability of the user equipment, where the indicator indicates the performance capability of the user equipment on at least the second radio access technology.

5. The method according to claim 4, wherein the received message includes two indicators of the performance capability of the user equipment, one of which indicates the performance capability of the user equipment on the second radio access technology and the other of which indicates the performance capability of the user equipment on the first radio access technology.

6. The method according to claim 1, wherein using the performance capability of the user equipment to obtain at least the second configuration comprises:
   using the performance capability of the user equipment to determine an expected performance metric for operation on the second radio access technology; and
   sending to a secondary radio access node operating with the second radio access technology a request for the interworking configuration, the request identifying the expected performance metric.

7. The method according to claim 6, wherein the request sent to the secondary radio access node further indicates the first configuration.

8. The method according to claim 6, wherein the interworking configuration is received from the secondary radio access node along with at least an estimated performance metric for operation on at least the second radio access technology.

9. The method according to claim 1, further comprising, after configuring the user equipment with the interworking configuration, at least one of:
   receiving from the user equipment an indication of measured performance on the second radio access technology; or
   sending to a secondary radio access node that provided the interworking configuration a request for at least one indication of measured performance on the second radio access technology.

10. A non-transitory computer readable memory storing computer program instructions that, when executed with one or more processors, cause a host device to perform actions comprising:
    determining that a user equipment is configured to support operation on a given radio band combination comprising a first radio band operating with a first radio access technology and a second radio band operating with a second radio access technology;
    determining that the second radio band operating with the second radio access technology is configured to support the operation of the user equipment with the given radio band combination, and using a performance capability of the user equipment to obtain at least a second configuration for the second radio band operating with the second radio access technology in response to the determining; and
    configuring the user equipment with an interworking configuration, the interworking configuration comprising a first configuration to operate on the first radio band with the first radio access technology and the second configuration to operate on the second radio band with the second radio access technology.

11. The computer readable memory according to claim 10, wherein:
    determining that the user equipment is configured to support operation on the given radio band combination comprises receiving from the user equipment a message identifying the given radio band combination and an indicator of the performance capability of the user equipment, where the indicator indicates the performance capability of the user equipment on at least the second radio access technology.

12. The computer readable memory according to claim 10, wherein using the performance capability of the user equipment to obtain at least the second configuration comprises:
    using the performance capability of the user equipment to determine an expected performance metric for operation on the second radio access technology; and
    sending to a secondary radio access node operating with the second radio access technology a request for the interworking configuration, the request identifying the expected performance metric.

13. An apparatus comprising:
    at least one non-transitory computer readable memory storing computer program instructions, and at least one processor;
    wherein the at least one computer readable memory with the computer program instructions is configured, with the at least one processor, to cause the apparatus at least to:
    determine that a user equipment is configured to support operation on a given radio band combination comprising a first radio band operating with a first radio access technology and a second radio band operating with a second radio access technology;

determine that the second radio band operating with the second radio access technology is configured to support the operation of the user equipment with the given radio band combination, and use a performance capability of the user equipment to obtain at least a second configuration for the second radio band operating with the second radio access technology in response to the determining; and configure the user equipment with an interworking configuration, the interworking configuration comprising a first configuration to operate on the first radio band with the first radio access technology and the second configuration to operate on the second radio band with the second radio access technology.

14. The apparatus according to claim 13, wherein:

the first radio access technology is evolved universal mobile telecommunications service terrestrial radio access technology;

the second radio access technology is third generation partnership project new radio or 5th generation radio access technology;

the apparatus comprises a master radio access node operating with the first radio access technology, the master radio access node transmits the first configuration to a secondary access node operating with the second radio access technology; and the master radio access node receives the interworking configuration from the secondary access node.

15. The apparatus according to claim 13, wherein:

determining that the user equipment is configured to support operation on the given radio band combination comprises receiving from the user equipment a message identifying the given radio band combination and an indicator of the performance capability of the user equipment, where the indicator indicates the performance capability of the user equipment on at least the second radio access technology.

16. The apparatus according to claim 15, wherein the received message includes two indicators of the performance capability of the user equipment, one of which indicates the performance capability of the user equipment on the second radio access technology and the other of which indicates the performance capability of the user equipment on the first radio access technology.

17. The apparatus according to claim 13, wherein using the performance capability of the user equipment to obtain at least the second configuration comprises:

using the performance capability of the user equipment to determine an expected performance metric for operation on the second radio access technology; and sending to a secondary radio access node operating with the second radio access technology a request for the interworking configuration, the request identifying the expected performance metric.

18. The apparatus according to claim 17, wherein the request sent to the secondary radio access node further indicates the first configuration.

19. The apparatus according to claim 17, wherein the interworking configuration is received from the secondary radio access node along with at least an estimated performance metric for operation on at least the second radio access technology.

20. The apparatus according to claim 13, wherein the at least one computer readable memory with the computer program instructions is further configured, with the at least one processor, to cause the apparatus to, after configuring the user equipment with the interworking configuration, at least one of:

receive from the user equipment an indication of measured performance on the second radio access technology; or send to a secondary radio access node that provided the interworking configuration a request for at least one indication of measured performance on the second radio access technology.

* * * * *